United States Patent [19]

Thor

[11] Patent Number: 5,651,387
[45] Date of Patent: Jul. 29, 1997

[54] VALVE CARTRIDGE

[75] Inventor: Anders Leif Thor, Sjömarken, Sweden

[73] Assignee: Voac Hydraulics Boras AB, Boras, Sweden

[21] Appl. No.: 402,955

[22] Filed: Mar. 13, 1995

[30] Foreign Application Priority Data

Mar. 11, 1994 [SE] Sweden ................................ 9400835

[51] Int. Cl.⁶ ........................................... F15B 13/044
[52] U.S. Cl. ................. 137/454.2; 137/269; 137/625.64; 137/625.65
[58] Field of Search ............................. 137/269, 454.2, 137/625.64, 625.65

[56] References Cited

U.S. PATENT DOCUMENTS

| | | | |
|---|---|---|---|
| 3,736,958 | 6/1973 | Rostad | 137/625.64 X |
| 4,478,245 | 10/1984 | Bender . | |
| 4,548,383 | 10/1985 | Wolfges | 137/454.2 X |
| 4,947,893 | 8/1990 | Miller et al. . | |
| 5,156,184 | 10/1992 | Kolchinsky . | |
| 5,163,477 | 11/1992 | Takano et al. . | |

FOREIGN PATENT DOCUMENTS

| | | |
|---|---|---|
| 0 073 268 | 3/1983 | European Pat. Off. . |
| 0 385 286 | 9/1990 | European Pat. Off. . |
| 0 451 272 | 10/1991 | European Pat. Off. . |
| 36 33 312 | 4/1988 | Germany . |

*Primary Examiner*—Gerald A. Michalsky
*Attorney, Agent, or Firm*—Frishauf, Holtz, Goodman, Langer & Chick

[57] ABSTRACT

An electromagnetic pilot valve cartridge which is directly mountable on a pilot pressure activated directional valve and which has a valve barrel for interconnection with a socket portion of a directional valve housing. The valve barrel has laterally disposed fluid communication openings respectively coupled to a pressure fluid passage and a drain passage in the directional valve housing. A pilot flow opening is disposed at an end portion of the valve barrel and is separated from the laterally disposed fluid communication openings by a seal ring, and a flow restricting device is associated with the pilot flow opening. The flow restricting device includes an end cap mounted on the end portion of the valve barrel and a flow restricting opening and an annular shoulder for axially supporting the seal ring.

9 Claims, 2 Drawing Sheets

5,651,387

VALVE CARTRIDGE

FIELD OF THE INVENTION

This invention relates to an electromagnetic pilot valve cartridge for direct mounting on a pilot pressure activated directional valve.

In particular, the invention concerns an electromagnetic pilot valve cartridge of the type comprising a valve barrel for interconnection with a socket portion in the directional valve housing, wherein the valve barrel has laterally disposed fluid communication openings for connection to a pressure fluid passage and a drain passage, respectively, in the directional valve housing, a pilot flow opening disposed at the end of the valve barrel and separated from said laterally disposed open logs by a seal ring, and a flow restricting means associated with the pilot flow opening.

OBJECT OF THE INVENTION

The object of the invention is to accomplish an improved valve cartridge of the above described type as far as compactness and simplicity in design and assemblage are concerned.

BACKGROUND OF THE INVENTION

Previous valve cartridges of the above type are disadvantageous mainly in that they have a long and space demanding valve barrel for introduction in a socket. portion in the directional valve housing. This is mainly due to the fact that the pilot flow restricting means comprises a nozzle like plug threaded into the end portion of the pilot valve bore. Accordingly, this plug type flow restricting means requires that the valve barrel is extended beyond the length needed just for the axial shifting movement of the pilot valve element.

Another disadvantage inherent in the above mentioned prior art pilot valve cartridge is that a thread has to be cut in the end portion of the valve bore for mounting of the flow restricting plug, and an outer circumferential groove has to be formed on the valve barrel for supporting the seal ring separating the pilot flow opening from the other lateral openings.

The above disadvantages are avoided by the invention as it is defined in the claims.

A preferred embodiment of the invention is described below in detail with reference to the accompanying drawings.

DETAILED DESCRIPTION

Figure 1:
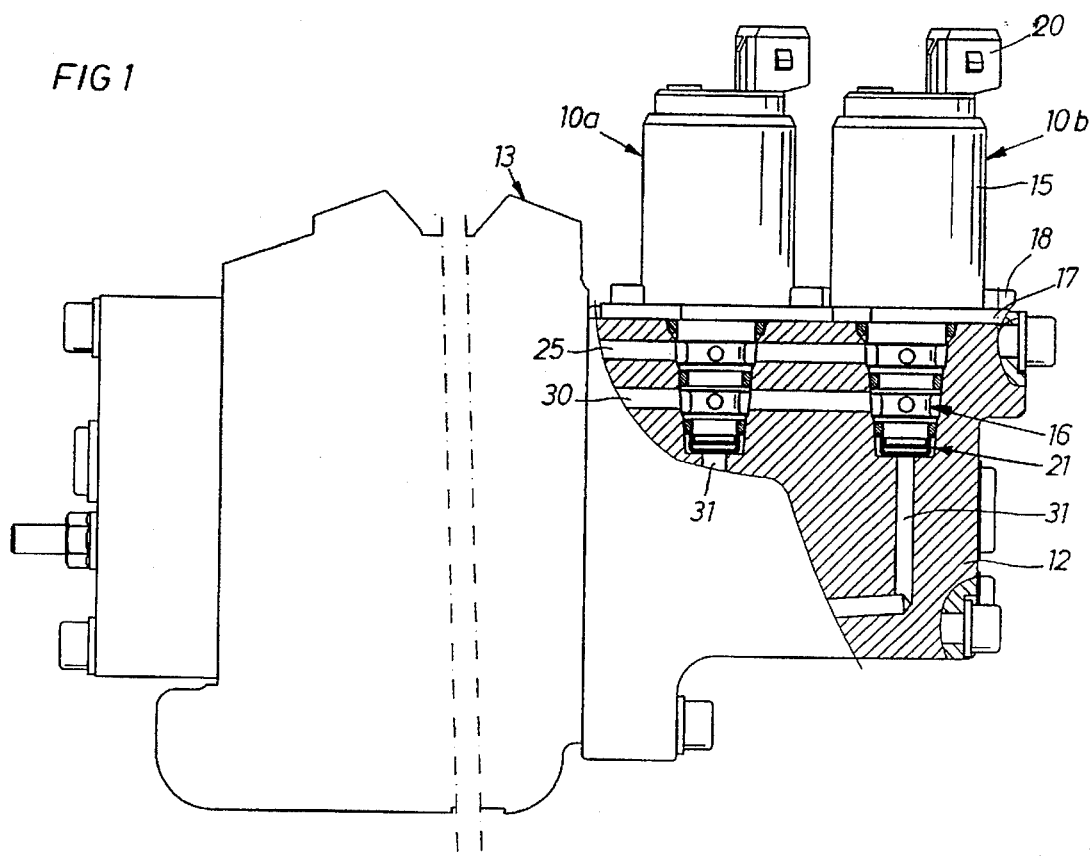
FIG. 1 shows, partly in section, two identical pilot valve cartridges according to the invention mounted on directional valve.

The valve arrangement shown in FIG. 1 comprises two identical pilot valve Cartridges 10a, 10b mounted on the housing 12 of a pilot pressure activated directional valve 13. The latter is intended to control the operation of a hydraulic motor and is connected to a hydraulic pressure pump and to a tank via a drain passage.

The hydraulic motor drive system, including the directional valve, belongs to a common and well known art and, therefore, it has been excluded from this detailed description.

As shown in FIG. 1, each of the two pilot valve cartridges 10a, 10b comprises an upper part 15 including an electromagnetic actuator, and a lower valve barrel 16. The actuator part 15 is formed with a radial mounting flange 17 by which the cartridge is secured to the directional valve busing 12 by screws 18. There also provided a connection block 20 for electrical wires (not shown) by which an activating current is supplied the electromagnetic actuator.

Figure 3A:
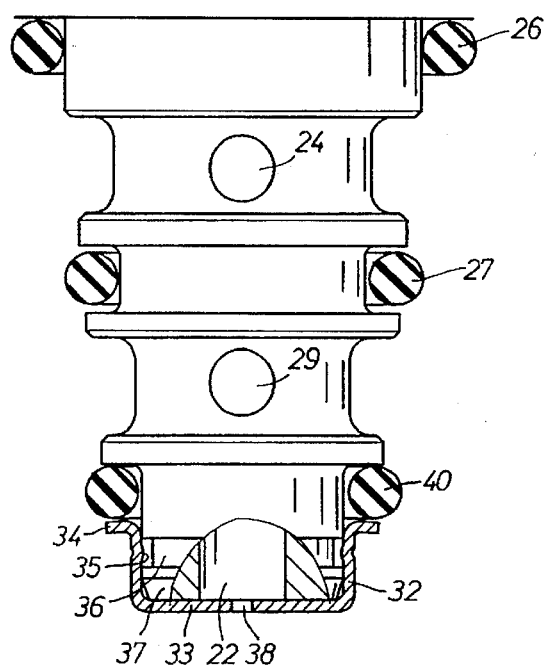
FIG. 3A shows, on a larger scale and partly in section, the end portion of the valve barrel.

The valve barrel 16 which is arranged to be received in a socket portion 21 in the directional valve housing 12 comprises an axial valve bore 22 (see FIG. 3A) in which is axially displaceable a valve element (not shown) coupled to the electromagnetic actuator. This is a well known commonly used structural design of a cartridge type pilot valve and does not constitute a part of the invention. Therefore, a detailed description thereof is not included in this specification.

Moreover, the valve barrel 16 is provided with a first lateral fluid communication opening 24 located at the same level as a drain passage 25 in the directional valve housing 12. The opening, 24 and the drain passage 25 are sealed off by two axially spaced seal rings 26, 27. The latters are disposed between the valve barrel 16 and the socket portion 21.

On a lower level, the valve barrel 16 is provided with a second lateral fluid communication opening 29 communicating with a pump connected pressure fluid passage 30 in the directional valve housing 12.

At the lower end of the valve barrel 16, the valve bore 22 is open to form a pilot flow communication opening. The latter is connected to either one of the pilot pressure actuators at the ends of the directional valve 13 via pilot flow passages 31 in the directional valve housing 12.

A pilot flow restricting cap 32 of substantially cylindrical shape is mounted on the end portion of the valve barrel 16. This end cap 32 is formed of pressed sheet metal and comprises a flat circular end wall 33 with a central flow restricting opening 38 and a radial circumferential flange 34. The cap 32 is also formed with a number of indentations or internal protrusions 35 for engaging a circumferential groove 36 on the valve barrel 16 and, thereby, retaining the cap 32 on the latter. A conical chamfering 37 at the extreme end of the valve barrel 16 facilitates entering of the cap 32 on the valve barrel 16 as the cap 32 is mounted on the latter by pressing.

A seal ring 40 is supported on the valve barrel 16 to seal off the pilot flow opening 38 from the other openings and passages, chiefly the pump pressure passage 30. The seal ring 40 is axially supported by the flange 34 of the cap 32.

Functionally, each one of the pilot valve cartridges arranged to act proportionally to an electrical control signal to supply or drain hydraulic fluid from one of the pilot pressure actuators of the directional valve.

At displacement of the valve element in the valve bore 22, the pilot flow passage 31 is alternatively connected to the pump pressure passage 30 and the drain passage 25. So, by alternatively pressurizing or depressurizing the pilot pressure actuators of the directional valve 13, the latter is made to control the operation of the hydraulic motor connected thereto.

Figure 3B:
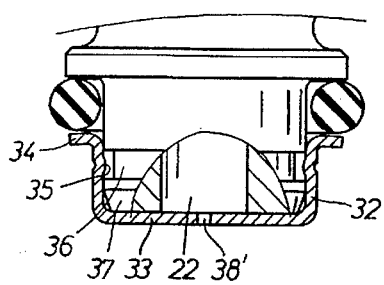
FIG. 3B shows the lower part of the valve barrel shown in FIG. 3A with an end cap having a smaller flow restriction opening.
Figure 3C:
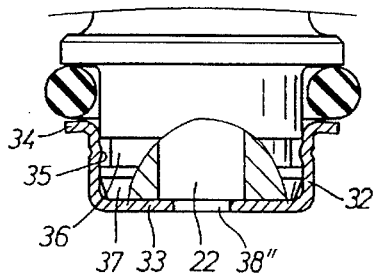
FIG. 3C shows the lower part of the valve barrel shown in FIG. 3A with an end cap having a larger flow restriction opening.
Figure 2:
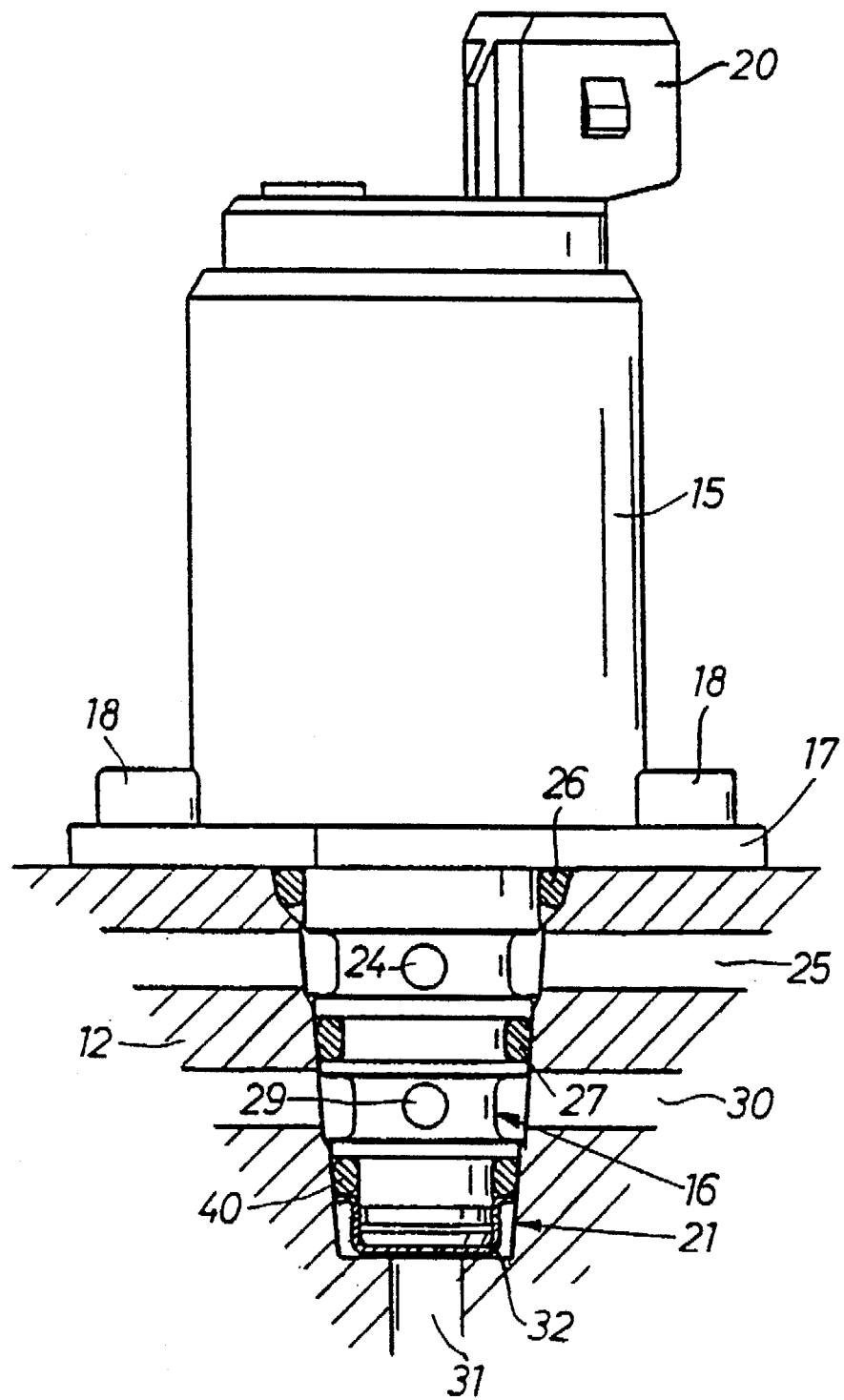
FIG. 2 shows a side view of a pilot valve cartridge according to the invention.

Depending on the actual motor application and the character of the load to be handled by the motor, it is desireable to be able to change the degree of pilot flow restricton, i.e. the size of the flow restricting opening 38. As shown in FIGS. 3B and 3C, the valve barrel may be provided with alternative end caps 32 having flow restriction openings of varying size. In FIG. 3B, the end cap 32 is provided with an opening 38' which is smaller than the opening 38 shown in FIG. 3A, whereas in FIG. 3C, the end cap 32 is provided with an opening 38" which is larger than the opening 38 shown in FIG. 3A.

Preferably, the flow restricting cap 32 is one of a set of interchangeable caps all with flow restricting openings of different sizes, and changing degree of flow restriction is easily done by exchanging the cap actually fitted on the valve barrel for another cap with larger or smaller restriction opening 38.

Apart from the fact that the pilot flow restricting end cap 32 and the seal ring 40 are very easy to mount on and remove from the valve barrel 16, this new arrangement makes it possible to substantially reduce the length of the valve barrel 16. The reason is that this new cup-shaped pilot flow restrictor cap is located entirely outside the valve bore 22 and has a thin end wall 33 only which adds very little to the length of the valve barrel 16. This means that the valve bore 22, as well as the valve barrel 16 itself, does not need to be any longer than what is needed for the shifting of the pilot valve element. The valve barrel 16 as well as the pilot valve cartridge as a whole may be given a very compact design. Also the space required in the directional valve housing 12 for the valve barrel receiving socket portions 21 is decreased, which results in a more compact overalls design.

I claim:

1. An electromagnetic pilot valve cartridge for direct mounting on a pilot pressure activated directional valve, comprising:

a valve barrel for interconnection with a socket portion of a directional valve housing;

said valve barrel having laterally disposed fluid communication openings respectively coupled to a pressure fluid passage and a drain passage in the directional valve housing; a pilot flow opening disposed at an end portion of said valve barrel and separated from said laterally disposed fluid communication openings by a seal ring; and a flow restrictor associated with said pilot flow opening; and wherein said flow restrictor comprises an end cap mounted on the end portion of said valve barrel and having a flow restricting opening and an annular shoulder for axially supporting said seal ring.

2. The valve cartridge of claim 1, wherein:

an outer circumferential groove is provided at the end portion of said valve barrel; and said end cap has at least one internal protrusion arranged to engage said groove for axially retaining said end cap relative to said valve barrel when said end cap is pressed on said valve barrel.

3. The valve cartridge of claim 1 or 2, wherein:

said end cap is formed of sheet metal; and said shoulder comprises a radial flange integrally formed with said end cap.

4. The valve cartridge according to claim 3, wherein:

said end cap is substantially cylindrical in shape and includes a flat circular end wall; and said flow restricting opening is provided in a center portion of said end wall.

5. The valve cartridge according to claim 4, wherein said end cap comprises one of a set of interchangeable end caps, each of said interchangeable end caps having a flow restricting opening of a different size.

6. The valve cartridge according to claim 3, wherein said end cap comprises one of a set of interchangeable end caps, each of said interchangeable end caps having a flow restricting opening of a different size.

7. The valve cartridge according to claims 1 or 2, wherein:

said end cap is substantially cylindrical in shape and includes a flat circular end wall; and said flow restricting opening is provided in a center portion of said end wall.

8. The valve cartridge according to claim 7, wherein said end cap comprises one of a set of interchangeable end caps, each of said interchangeable end caps having a flow restricting opening of a different size.

9. The valve cartridge according to claims 1 or 2, wherein said end cap comprises one of a set of interchangeable end caps, each of said interchangeable end caps having a flow restricting opening of a different size.

* * * * *